2,946,660
METHOD OF PREPARING SILICEOUS PIGMENTS

Edward L. Priebe, Milton, Fla., and Joseph A. McCarthy, Mahtomedi, Minn., assignors to Columbia-Southern Chemical Corporation, Allegheny County, Pa., a corporation of Delaware No Drawing. Filed Nov. 1, 1957, Ser. No. 693,823

13 Claims. (Cl. 23—182)

This application is a continuation-in-part of Serial No. 476,573, filed December 20, 1954, and now abandoned.

This invention relates to the purification of finely divided particles of silica generally prepared in the manner hereinafter disclosed. When an alkali metal silicate is reacted with an acid under specific conditions, an essentially agglomerated and filterable form of silica results therefrom. If, for instance, sodium silicate is reacted with carbonic acid or other acid, the product slurry contains up to about 3 percent by weight of $Na_2O$ combined therewith and/or up to about 7 or 8 percent by weight of polyvalent cations, such as aluminum, iron or the like, as well as appreciable amounts (0.5 to 5 percent by weight) of cations due to the presence of alkali metal salt, such as sodium carbonate, sodium bicarbonate, sodium chloride, and so forth.

By controlling the reaction conditions it is possible to effect precipitation of silica particles having an average ultimate particle size below 0.1 micron, usually 0.015 to 0.05 micron, by addition of acid or acidic material to alkali metal silicate. These fine particles form agglomerates which are somewhat larger in size, ranging from 0.1 to 10 microns usually, most of the particles being in excess of 1 micron, 40 percent or more being in the range of 2 to 7 microns.

The ions appearing in the product slurry have heretofore been effectively removed by washing and acid extraction. However, this process of purification leaves much to be desired in that much cumbersome equipment is necessary, thereby making the process expensive and difficult.

As disclosed in copending application of Kissling et al., Serial No. 374,432, filed August 14, 1953, it has been found that such filterable silica which contains an appreciable concentration, usually ranging from 0.5 to 5 percent by weight, of alkali metal ions, such as $Na^+$ and/or $Na_2O$, may be purified by mixing in the presence of water with an ion exchange resin in pulverulent form but having a particle size substantially larger than that of the silica subjected to treatment, selectively separating the resin from the resulting silica slurry, and then recovering the treated silica essentially free from resin. Cations may be thus removed by mixing the silica with the acidic form of an ion exchange resin in amount sufficient to reduce the pH of the resulting slurry below 5, preferably in the range of 1 to 4.

This process is to be distinguished from prior art processes which form a silica sol which is a stable silica suspension by ion exchange. Thus it is known to treat an aqueous solution of sodium silicate with an ion exchange resin in order to remove partially sodium ions from the solution and to produce a silica sol. See U.S. Patent No. 2,631,134. Also, it is known to treat a silica sol with magnesium chloride or the like to form a precipitate and to treat the precipitate with an ion exchange resin in the presence of alkali at a pH of about 10.7 in order to absorb the magnesium therefrom and to redissolve the silica and to produce a sol. See U.S. Patent No. 2,605,228.

In all such prior processing the effect of a resin is to produce a sol in which the silica is essentially unagglomerated and is in the form of a stable colloidal solution as distinguished from a filterable slurry. When dried, such products tend to form a gel as contrasted to a friable powder.

The separation of a silica sol from the ion exchange resin is simple since the sol is stable and does not separate from suspension. This is not true, however, of filterable silica which dries to a pulverulent powder; in fact, when the silica slurry herein contemplated is passed through an ion exchange resin bed, deposition of the silica on the resin occurs to a substantial degree.

The Kissling et al. application above identified further states that when resin having a particle size substantially larger than that of the filterable silica is used, it is possible to separate the resin without deposition of silica thereon. This may be done, for example, by selectively settling the resin and decanting the silica slurry before substantial settling of silica on the resin can occur. It may also be accomplished by selectively centrifuging the silica slurry from the resin. In either case the silica is separated from the resin while the silica is in suspension and before it can settle out on the resin. Deposition of silica on the ion exchanger can be minimized by mild stirring, if necessary, of a silica slurry to keep the silica in suspension while allowing the ion exchanger to fall out. Of course, deposition of minor amounts of silica on the resin is not serious since it may be removed in subsequent use or treatment of a resin. Thus it is advantageous to permit deposition of a small amount ranging from 0.1 to 10 percent of silica on the basis of the resin. This insures accurate removal of the resin from the silica and thus avoids contamination.

According to a further embodiment of said application, the resin may be filtered or screened from the silica slurry by passing the mixture through a screen having a screen size of about 40 to 100 mesh. A filter cake thicker than about ½ to 1 inch should not be allowed to accumulate on the screen since the cake will then cause deposition of the silica thereon.

Silica slurry treated in this way can be obtained surprisingly free from resin. It may be recovered by filtration readily. When dried, for example, by spray drying, a very white, highly pure, freely flowing silica is obtained. No discoloration due to decomposition of residual resin in the product takes place.

In the copending application above described, a purified finely divided silica is prepared having a wide variety of uses. For instance, it may be combined with rubber latex and the latex coagulated to produce rubber having a silica dispersed therein. It may be dried to produce a finely divided silica. An especially light, freely flowing silica useful in grease, silicone rubber, natural or GR–S rubber, and the like, may be prepared by spray drying the silica slurries formed by treatment of the alkaline filter cake.

An especially desirable silica useful for incorporation in silicone rubber must have a pH of about 3 to 6, preferably about 4. Thus, when treating the precipitated silica slurry with a cation exchange resin as in the above-described Kissling et al. process, it has required several treatments with the resin to lower the slurry pH to a desirable figure. It is characteristic of dried precipitated silica that, upon standing or upon reslurrying with water, the pH increases. For example, a resin-treated silica slurry having a pH of about 2.8 will increase to about 4 when it is dried and reslurried in water. Consequently, in order to prepare a silica which is desirable for use in slicone rubber, it is necessary that low pH values exist in the resin-treated silica slurry, preferably values ranging from 1 to 3.

Heretofore, these values were attainable only by repeated treatments with the cation exchange resin, a costly and tedious process. The addition of an acid, such as HCl, would serve to lower the pH value but it would also increase the anion concentration undesirably.

According to this invention a method of purifying acid precipitated, finely divided, filterable silica containing cationic impurities has been found which comprises forming an aqueous slurry of the silica, establishing therein a small amount of metal salt, generally from about 0.02 gram to 0.50 gram of the metal salt per liter of slurry, and treating the slurry with an ion exchanger. This precludes the repeated purification steps just mentioned by affording a silica slurry having a pH of about 2.8 after one treatment, a completely unexpected result. Although the metal salt may be introduced at any convenient point prior to the ion exchange purification step, it has been found preferable to add it to the precipitated filter cake after decanting any dissolved impurities in the precipitation product mixture. As stated above, enough metal salt should be added to provide between about 0.02 gram and 0.50 gram of the salt per liter of slurry, preferably between about 0.18 gram and 0.38 gram per liter of slurry.

The process herein contemplated is especially valuable when the silica is precipitated by adding to an alkali metal silicate a weak acid which has a dissociation constant below about $1 \times 10^{-4}$ for the first hydrogen and which is a gas in its anhydrous state. Typical of such are carbon dioxide, sulfur dioxide, and hydrogen sulfide. When such agents are used, the predominant anion present is that of the acid (carbonate, sulphite, sulfide, etc.). When the silica is treated with an ion exchange resin in the hydrogen form, not only are the cations removed but also the anions are largely driven off, thus effecting reduction of the anion and cation concentration simultaneously.

In order to remove the metallic cations from the silica effectively it is necessary to use enough cation exchanger to reduce the silica slurry pH below about 6, preferably to about 2 to 4. At higher pH, removal is not adequate.

The present process is particularly valuable when used in connection with silica which has been acid precipitated under carefully controlled conditions, as hereinafter described, to produce pulverulent silica having a surface area of 25 to 400 square meters per gram, preferably in the range of about 50 to 200 square meters per gram. The surface area of the silica subjected to treatment may be measured by the Brunauer-Emmett-Teller method described in the Journal of the American Chemical Society, volume 60, page 309 (1938).

Silica of this type contains at least 90 to 95 percent by weight $SiO_2$ on an anhydrous basis, i.e., free of "bound water" and "free water." The term "free water" denotes water which may be removed from the silica pigment by heating it at a temperature of 105° C. for a period of 24 hours in a laboratory oven. The term "bound water" is intended to mean the amount of water which is driven off a siliceous pigment by heating the pigment at ignition temperature, for example, 1000° C. to 1200° C., until no further water can be removed, minus the amount of free water in the pigment.

In contrast to a silica sol, the silica particles in such a slurry are in the form of flocs of loosely agglomerated particles, the flocs being highly porous. Thus, while the ultimate particle size as observed by the electron microscope is in the range of 0.015 to 0.05 micron, the actual particle size is larger, usually ranging from 0.1 to 10 microns. Precipitation of a silica subjected to treatment according to this invention can be effected readily by addition of carbon dioxide to sodium silicate solution according to the conditions disclosed in an application of Fred S. Thornhill, Serial No. 308,249, filed September 6, 1952, now abandoned. Specific examples of this method of precipitating silica will be disclosed hereinafter.

According to a preferred embodiment, the silica produced by this precipitation method is then filtered and washed to remove dissolved salt from the slurry. The resulting filter cake is then treated with one of the metal salts contemplated herein. If desired, a mixture of these salts may be employed. Subsequently, the filter cake is subjected to the ion exchange resin treatment described above.

Among the many metal salts contemplated herein are the alkali salts, such as potassium sulfate, potassium nitrate, potassium bromide, sodium nitrate, sodium sulfate, sodium chloride, sodium oxalate, sodium acetate, ammonium chloride, ammonium sulfate, and the like; and alkaline earth metal salts, such as barium chloride, barium sulfate, calcium sulfate, calcium chloride, aluminum chloride, aluminum fluoride, aluminum sulfate, aluminum acetate, magnesium sulfate, magnesium chloride, magnesium bromide, and the like. These are typical of the numerous salts which are suitable for the present invention.

Preferably, water-soluble salts, even though slightly soluble in water, are employed. For example, barium sulfate which is only slightly soluble in water is suitable in the slurries of the present invention. The ion exchange resin present in the slurries enhances the solubility of the metal salt.

It is desirable that the silica slurry resulting from the precipitation process be stabilized prior to the ion exchange step since the surface area of the silica subjected to this treatment rises seriously and may even rise to the point where the product effectively becomes a gel. Stabilization may be realized by heating the silica in aqueous medium to a temperature above 60° C., preferably 80° C. to 100° C. or above, for a substantial period, preferably about 30 or more minutes. Such treatment stabilizes the silica so that it is unaffected by the subsequent ion exchange treatment. Alternatively, the silica may be dried at drying temperatues (e.g., 100° C. or above) and redispersed for treatment according to this invention.

Stabilization may also be effected at temperatures above 100° C., for example, 120° C. to 300° C., the time of the heat treatment being considerably shorter than 30 minutes, however. In fact, if the silica slurry is heated for a prolonged period in excess of 30 minutes at a temperature above about 120° C., the particle size of the silica tends to grow unduly.

When stabilizing in an aqueous medium at a pH of not less than 5 and at a temperature of above 100° C., preferably in the range of 120° C. to 300° C., usually at least 10 to 30 seconds but not more than about 25 minutes of heating is desirable.

A further factor in stabilizing the silica is the use of substantially the stoichiometric amount or more of acid required to react with the alkali metal silicate to produce the alkali metal salt (as distinguished from the acid salt). Thus, enough acid should be added to the sodium silicate to reduce the amount of combined sodium or like alkali metal below about 3 percent by weight, based upon the weight of the silica.

Various types of carbonaceous ion exchange resins may be used. Typical types which are useful are those produced by sulfonation of polystyrene and copolymers of styrene with vinyl benzene. See, for example, U.S. Patents 2,366,077; 2,631,127; etc. Other sulfonated insoluble materials of high molecular weight, such as sulfonated phenyl-formaldehyde resin, sulfonated lignin or peat, or the like, may be used.

Anion exchange resins useful for the purpose herein contemplated include the amino and like nitrogenous resins such as those derived from styrene and its copolymers. See, for example, U.S. Patent 2,591,573. The resin used should be granular but not too fine. Otherwise, it will not selectively settle or otherwise separate from the silica slurry. On the other hand, the resin should be dispersible in the silica-water mixture. Products having a particle size of about 10 to 100 mesh have been found to be suitable.

According to one particular embodiment of this invention, it has been found expedient to wash out from the silica slurry most of the mother liquor which contains dissolved salts. Next, the filter cake is treated with sodium nitrate, for example. Thus-treated silica is then admixed with an ion exchange resin and the resulting mixture allowed to stand with agitation until it has come to substantial equilibrium. Then the resin is separated from the silica. Said separation may be effected by settling, decantation, centrifugation or other mechanical means. If settling is used, the silica slurry should be removed from the resin before it can settle on the resin to any objectionable degree, and, in any case, the removal must be conducted under conditions which permit selective removal of silica slurry which is essentially uncontaminated by resin. This can best be done by removing only a portion of the silica, leaving with the resin some silica, for example, ¼ to 25 percent of silica by weight of resin. This silica may be washed from the resin later. Hence, in decantation, the top portion of the mixture is withdrawn as silica slurry and the remaining silica is collected with the resin and this mixture washed later to remove silica.

In separating the resin from silica by centrifuging, the silica and resin slurry is fed to a centrifuge having a screen with openings of about 0.005 to 0.025 inch, and the centrifuge is rotated at high speed to throw out silica slurry. This process permits complete or essentially complete removal of the silica slurry from the resin.

However, it is also advantageous to take out most of the silica and to leave a small amount, for example, ¼ to 25 percent, of silica on the resin. Thereafter, the resin is washed with water and this slurry collected separately. This insures collection of highly pure silica.

According to a further embodiment, both decantation and centrifugation may be combined by allowing the resin to settle, withdrawing a top portion of supernatant silica slurry, and then centrifuging the remainder.

An especially effective mode of practicing the present invention involves the treatment of filter cakes obtained by filtration of silica slurries resulting from the acidification of an aqueous alkali metal silicate solution. Such filter cakes normally contain 12 to 20 percent by weight of solids, the balance being water. After preliminarily adding the salts contemplated herein to the filter cake as mentioned above, the resin may conveniently be mixed with such filter cake while limiting the amount (if any) of water added to the mixture so that the silica content does not fall below about 12 percent, based upon the silica and water content of the mixture, and separating the resin from the silica slurry. This process is especially valuable when silica slurries having a pH above 6, preferably above 7, are filtered. Filter cakes from such slurries contain an appreciable amount of water and, when treated with an acidic ion exchanger, reduce to a pH below 7 and thin out to a readily flowable slurry which can be easily separated from the resin.

The amount of ion exchange resin used is enough to remove the ions. To effectively remove the cation, the pH of the slurry should be reduced by ion exchanger below 5, preferably about 2 to 4. If desired, the silica slurry may be acidified with the cation exchanger or it may be acidified with other acids and then treated with resin. The latter process adds ions, thus reducing the purity of the product or requiring treatment with an anion exchanger. For most purposes, about 1 or more pounds of ion exchanger is required per pound of silica in the slurry.

According to a further embodiment, the slurry may be dried by azeotropic distillation with organic liquids, or the slurry may be filtered and the filter cake dried by azeotropic distillation.

The following examples are illustrative:

EXAMPLE I

Seventeen thousand gallons of a sodium silicate solution are placed in a 50,000 gallon tank. This solution contains the sodium silicate $Na_2O(SiO_2)_{3.3}$ in amount sufficient to establish an $Na_2O$ concentration of 20.3 grams per liter. It contains no sodium chloride except the minor amount (less than 0.08 percent by weight) usually present in commercial sodium silicate. The solution is held at a temperature of 167° F., plus or minus 5 degrees. Carbon dioxide gas containing 10.0 to 10.8 percent by volume of carbon dioxide, the balance being nitrogen and air, is introduced into the solution at a gas temperature of 115° F. to 145° F. at a rate sufficient to provide 1250 cubic feet of the carbon dioxide gas per minute, measured at 760 millimeters pressure and 0° C. This gas is introduced directly into a turboagitator in a manner to achieve uniform distribution of the gas, and the mixture is vigorously agitated. Carbon dioxide introduction is continued at this rate for 8½ hours, at which time about 120 to 140 percent of the theoretical amount of carbon dioxide has been introduced. After this period of 8½ hours, the rate of introduction of carbon dioxide is reduced to 400 cubic feet per minute and the solution is boiled for 1½ hours. The resulting silica has a surface area of about 140 to 150 square meters per gram and is in the form of porous flocs of particles of the size discussed above.

The resulting silica slurry has a pH of about 9.5. This slurry is then filtered and the filter cake is washed twice with de-ionized water using approximately one gallon of water per pound of dry $SiO_2$ at each wash. The resulting filter cake is divided into six different portions, each of which is treated with a metal salt and admixed with a sulfonated polystyrene cation exchanger having a particle size of 16 to 70 mesh. As shown in the following table, these portions are made up to certain slurry concentrations:

Table 1

| Experiment No. | Weight of Slurry in Grams | Percent of Solids in Slurry by weight | Amount of Metal Salt Additive in Grams | Amount in Grams of Resin Used to lower pH of slurry to 2.8 |
|---|---|---|---|---|
| 1 | 500 | 11 | 0.164—$CaCl_2$ | 22.5 |
| 2 | 500 | 11 | 0.168—NaCl | 22.0 |
| 3 | 500 | 11 | None | 185.0 |
| 4 | 500 | 5 | 0.179—NaCl | 18.5 |
| 5 | 500 | 5 | 0.175—$CaCl_2$ | 18.0 |
| 6 | 500 | 5 | None | 390.0 |

The resin contains about 50 percent by weight of moisture. In making the runs shown in Table I, the silica-resin mixture is stirred and then allowed to stand, in order to permit the resin to settle out. The silica thus separated is spray dried.

It can be seen from the above table that when no metal salt is present, a greater amount of resin is required to achieve the desired pH of 2.8. Consequently, the improvement afforded by the present invention is very significant.

While the solids concentrations in the slurries treated in runs 1 to 6 of Table I are either 11 or 5 percent by weight, it is understood that concentrations substantially higher than 11 percent are suitable. As stated hereinabove, an especially effective mode of practicing the invention involves the treatment of filter cakes containing 12 to 20 percent by weight solids. The resin treatment thins out the cake to a readily flowable slurry which can be easily separated from the resin.

Very good results are obtained by the process of the instant discovery even with slurries having solids concentrations below about 4 percent by weight and as high as 20 percent by weight or more.

In the Fred S. Thornhill application above mentioned, numerous methods of preparing silica suitable for ion exchange resin treatment have been described in detail. The following is typical:

EXAMPLE II

A 30-gallon, open-top barrel, provided with an agitator consisting of a vertical shaft driven by a one-quarter horsepower motor and having 3 three-inch propellers, is charged with 48 liters of an aqueous solution of sodium silicate $Na_2O(SiO_2)_{3.36}$ containing 20.3 grams per liter of $Na_2O$, about 66 grams per liter of $SiO_2$, and 10 grams per liter of sodium chloride. Carbon dioxide gas, diluted with air to such an extent that the diluted gas has a $CO_2$ concentration of about 10 percent by volume, is introduced into the drum through a stainless steel tube with the discharge end of the tube being located below the bottom of the agitator. The rate of introduction of gas is adjusted so that just the theoretical amount of carbon dioxide is introduced into the solution in 24 hours. This carbonation rate is held substantially constant over the carbonation period. The temperature is maintained at 35° C. during carbonation and the mixture continuously agitated.

After the theoretical amount of carbon dioxide is introduced, the mixture is heated by direct introduction of steam from a 140-pound steam line to maintain the temperature of the slurry at boiling temperature for a period of about 2 hours. This mixture is then filtered and treated with a metal salt, etc., as described above in Example I.

Although only several processes for producing slurries of pigmentary or pulverulent silica have been described, it will be understood that the process contemplated herein is applicable to various finely divided particles of silica which are present in an essentially agglomerated and filterable form.

While the instant disclosure has heretofore concerned itself with the purification of silica prepared by acid precipitation of an alkali metal silicate, the novel process described herein is applicable to acid precipitated pigmentary silica prepared by other methods. Silica prepared by acid precipitation of calcium silicate, for example, may be treated in the manner disclosed herein and thereby enhance its purity without the necessity of cumbersome and repetitious steps.

The expression "filterable silica" used in the accompanying claims refers to silica which is in a filterable form, e.g., silica prepared in the manner herein disclosed by acid precipitation, as distinguished from a sol, when subjected to treatment to remove metallic cations therefrom.

The expressions "metal salt" and "alkali salt" as employed herein are intended to include ammonium salts as well as alkali metal salts.

While the present invention has been described with reference to the specific details of certain embodiments, it is not intended that such embodiments shall be regarded as limitations upon the scope of the invention except insofar as they are included in the accompanying claims.

What is claimed is:

1. A method of purifying acid precipitated, finely divided, filterable silica containing impurities in the form of cations which comprises subjecting the filterable silica to the action of an ion exchange resin in the hydrogen form and an aqueous medium containing a small amount of an added water soluble metal salt, the salt and ion exchange resin being present in an amount sufficient to reduce the pH of the silica below 6, allowing the resin in the hydrogen form to absorb the impurities in the form of ions, and then separating the resin to obtain an aqueous slurry of filterable silica having a pH below 6.

2. The method of claim 1 wherein the metal salt present in the aqueous medium is calcium chloride.

3. The method of claim 1 wherein the amount of metal salt in the aqueous medium is greater than at least about 0.02 gram per liter.

4. The method of claim 1 wherein the amount of metal salt in the aqueous medium is between about 0.02 gram and 0.50 gram per liter.

5. The method of claim 1 wherein the silica to be purified is in the form of flocs having a particle size in the range of 0.1 to 10 microns, and the average size of the ion exchange resin is greater than the average size of the silica flocs.

6. The method of claim 1 wherein the amount of metal salt and ion exchange resin is sufficient to reduce the pH of the slurry below 4, and wherein the resin is separated by passing the mixture of filterable silica and ion exchange resin through a screen having openings large enough to permit passage of the silica and small enough to restrain passage of the resin.

7. A method of purifying a finely divided, filterable silica which has been precipitated by the addition of carbon dioxide to an aqueous solution of alkali metal silicate until precipitation of silica is substantially complete and a silica slurry is formed, said silica containing cationic impurities, which comprises introducing into the silica slurry about 0.02 to 0.50 gram per liter of a water soluble metal salt and an ion exchange resin in the hydrogen form, the salt and ion exchange resin being sufficient to produce a slurry having a pH below 6, allowing the resin to absorb the ions present as impurities in the silica mixture and separating the resin from the silica by settling, to obtain a slurry of filterable silica having a pH below 6.

8. In the process of preparing silica in a precipitated, filterable form by the addition of acid to an aqueous alkali metal silicate solution in amount sufficient to precipitate the silica in the form of finely divided, filterable flocs and form a slurry of such precipitated silica, said silica being thereafter stabilized by heating, the improvement which comprises removing cationic impurities from silica of said silica slurry by introducing into the silica slurry about 0.02 to 0.50 gram per liter of a water soluble metal salt and an ion exchange resin in the hydrogen form, the salt and ion exchange resin being sufficient to produce a slurry having a pH below 6, allowing the resin to absorb the ions present as impurities in the silica mixture and separating the resin from the silica by settling, to obtain a slurry of filterable silica substantially free from resin having a pH below 6.

9. The method of claim 1 wherein the filterable silica containing impurities and ion exchange resin are mixed with the aqueous medium, the solids concentration of the aqueous medium after said mixing being between about 4 and 20 percent by weight.

10. The method of claim 1 wherein the filterable silica containing impurities is initially in the form of a filter cake.

11. The method of claim 10 wherein the filterable silica in the form of a filter cake and the ion exchange resin are mixed with the aqueous medium, the solids concentration of the aqueous medium after said mixing being between about 4 and 20 percent by weight.

12. The method of claim 9 wherein the solids concentration of the aqueous medium after the mixing is below about 4 percent by weight.

13. The method of claim 9 wherein the solids concentration of the aqueous medium after the mixing is between about 4 and 11 percent by weight.

References Cited in the file of this patent

UNITED STATES PATENTS

| | | |
|---|---|---|
| 2,244,325 | Bird | June 3, 1941 |
| 2,260,971 | Goetz | Oct. 28, 1941 |
| 2,605,228 | Alexander et al. | July 29, 1952 |